United States Patent [19]

Hosokawa et al.

[11] 4,053,143

[45] Oct. 11, 1977

[54] SCREW FOR USE IN AN EXTRUDER

[75] Inventors: Akira Hosokawa, Otsu; Yukifusa Miyazaki, Kusatsu; Yoshio Yada, Otsu; Yasuo Kitamura, Otsu; Masasi Takeda, Otsu, all of Japan

[73] Assignee: Toray Industries, Inc., Tokyo, Japan

[21] Appl. No.: 610,077

[22] Filed: Sept. 3, 1975

[30] Foreign Application Priority Data

Nov. 14, 1974 Japan .................................. 49-130475

[51] Int. Cl.² .............................................. B30B 11/24
[52] U.S. Cl. ..................................................... 366/89
[58] Field of Search ........................ 259/191, 192, 193

[56] References Cited

U.S. PATENT DOCUMENTS

| | | | |
|---|---|---|---|
| 3,762,693 | 10/1973 | De Boo | 259/191 |
| 3,814,779 | 6/1974 | Wiley | 259/191 |
| 3,881,708 | 5/1975 | Carle | 259/191 |

*Primary Examiner*—Richard E. Aegerter
*Assistant Examiner*—Willis Little
*Attorney, Agent, or Firm*—Haseltine, Lake & Waters

[57] ABSTRACT

There is provided a screw for use in an extruder comprising a melting section and a metering section and a decompression section therebetween so that the head pressure profile along the longitudinal direction of the extruder is higher than atmospheric pressure and has an inflection point, with the result that a high melting performance is attained and a high extrusion stability is ensured even at a high extrusion rate.

1 Claim, 10 Drawing Figures

SCREW FOR USE IN AN EXTRUDER

The present invention relates to an improved screw for use in an extruder to ensure a stable extrusion of resin while allowing the extension rate to be controlled over a wide range.

In order to improve the extrusion performance of the non-vent type extruder, consideration has been given to increasing the depth of the screw channel, enlarging the diameter of the screw or increasing the speed of revolution of the screw. However, increasing the depth of the screw channel would cause reduction of heat energy due to viscous dissipation within the barrel and, thus, reduction of the melting performance and of uniform heat-transfer to the resin to be extruded.

This results in a stable and uniform extrusion not being ensured. Consequently, any increase of the channel depth must be a very limited increase.

Enlarging the diameter of the screw does not involve any substantial difficulty in the technology concerned, which is, of course, an advantage. However, a disadvantage which accompanies the increased extrusion performance in this case is that the dimensions, and accordingly the cost of the extruder are increased. Further it is difficult for an extruder with a screw of large diameter to ensure a stable extrusion over a wide range such as, for example, the range over which the extrusion rate of a specially designed extruder in use for making various thick films can be changed. Therefore the extruder with a large diameter screw has an additonal disadvantage in that it can not be applied in the field where the extrusion rate is required to be controlled over a wide range.

With respect to a conventional extruder having a one-stage screw, when the speed of revolution of the screw is increased, an increased viscous dissipation occurs, with the result that the temperature of the molten resin is elevated over that which is necessary. This results in deteriorating the quality of the extrudate. Further, the zone where the molten resin and the unmelted resin exist in a mixed state is unstable, with the result that the temperature of the extrudate varies and an extrudate containing the unmelted resin is often obtained. Still further, there is the disadvantage that the required motive power per unit extrudate is considerably increased.

However, there is a serious problem involved, with respect to the simple two stage screw extruder which has been designed as a vent-type extruder and is used conventionally. That is it is very difficult to design the screw so that the output rate from the first stage matches that from the second stage with the result that the "vent-up" or the "starving phenomenon," which would enhance the variation of the extrusion rate, is eliminated. On the other hand, there has been little consideration or study of the idea of modifying the simple two stage screw extruder to change it into a non-vent type extruder which could operate with a screw revolution speed ranging from low to high. Neither has any study ever been made of how to practically employ such a modified extruder. One recent study concerning an extruder is directed to modification of the conventional single stage screw extruder by providing an additional means such as a mixing means to the screw, at the middle section or forward section thereof, so that the extruder performance is improved. Another recent study is directed to attempts at improving a twin screw extruder or a Dandem type extruder so that increased extrusion performance is obtained. At present the study of improving extrusion performance in the single screw extruder without such an additional mixing means as mentioned above has been almost given up.

A two-stage screw extruder of vent type is known. Therefore, modification of such an extruder to a non-vent type may be considered. However, mere modification of two-stage screw vent type extruder into a non-vent type extruder or mere substitution of the two-stage screw for the single-stage screw in a non-vent type extruder does not improve the extrusion performance of the non-vent type extruder. That is, such a modified extruder lacks stability of extrusion in the sense that a stable and uniform extrusion is not ensured over a range of variable screw revolution speeds from high to low, as explained later.

In view of the above it is considered that, instead of developing the study of the application of the two-stage screw, the study of the modification of the one-stage screw with the additional functional means as previously mentioned has been developed. However, it should be noted that the modified one-stage screw has a disadvantage in that the extrusion rate is not increased very much compared to the increased dimensions of the extruder, even though the stability of extrusion is improved. This is because the additional means provided on the screw acts as a resistor positioned in a passage of the melted resin. It should be also noted that there is a serious problem involved in that such resistor causes generation of unnecessary heat energy due to viscous dissipation with the result that the temperature of the extrudate is increased, while the consumed power is increased.

An object of the present invention is to provide a screw for use in an extruder which eliminates the above-mentioned disadvantages of the conventional extruder, particularly the disadvantages resulting from the high speed of revolution of the one-stage screw, with the attendant advantage that the variable extrusion rate can be controlled over a wide range, while a stable extrusion is ensured.

A second object of the present invention is to provide a screw, for use in an extruder, of a simple construction which is so designed that the extruder consumes considerably less power than the conventional one in the extruding operation.

Other objects of the present invention will be clarified in the following description.

According to the present invention, there is provided a screw of two-stage type, for use in an extruder, having: a feed section where the channel depth is $h_1$ hind end; the hindend; a melting section subsequent to the feed section, where the channel depth gradually decreases along the forward direction to a value of $h_2$; a decompression section subsequent to the melting section, where the channel depth increases to a value of $h_3$ and gradually decreases to a value of $h_4$; and; a metering section subsequent to the decompression section, where the channel depth is a constant value of $h_4$; wherein $\epsilon > S_3/S_2 > 0.5 \epsilon$ and $1.5 > h_4/h_2 > 1.15$, where $\epsilon$ is compression ratio of the melting section to the feed section, and $S_2$ and $S_3$ are cross sectional areas of the channel with the depth $h_2$ and the channel with the depth $h_3$, respectively.

$\epsilon$ is expressed by $h_1(D_1-h_1)/h_2(D_2-h_2)$, and $S_2$ and $S_3$ are expressed by $\pi h_2(D_2-h_2)$ and $\pi D_3(D_3-h_3)$, respectively where $D_1$, $D_2$ and $D_3$ are the outer diameters of the screw at the feed section, melting section and the decompression section, respectively. According to the present invention, the outer diameter of the screw at each section is a design option. Generally, a screw with a constant outer diameter over all the sections is adopted. However the present invention is not limited to such a constant outer diameter.

The present invention will be more fully described by way of example with reference to the accompnying drawings, in which.

Figure 1A:
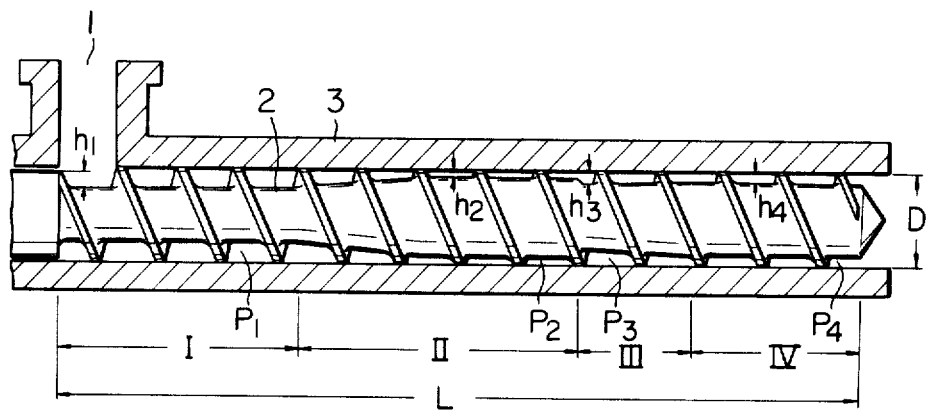
FIGS. 1A and 1B are longitudinal sectional views of extruders in which the screws according to the present invention are applied, respectively.

With respect to the conventional one-stage screw, the screw must be so designed that the extrusion performance and the extrusion stability are balanced as high as possible. Contrary to this, according to the present invention, the extrusion performance and the extrusion stability can be enhanced independently by so designing an extruder of a two-stage type in which a melting section for exerting a high melting function, a metering section and a decompression section therebetween are provided under specific conditions.

With respect to the specific conditions, the compression ratio $\epsilon$ of the melting section to the feed section is slightly higher than that of the conventional one-stage screw. The compression ratio is a ratio of the cross sectional area of the channel at the forward end in the melting section to the cross sectional area of the channel at the hind end in the feed section, and is expressed by $(h_1/h_2) \cdot (D-H_1/D-h_2)$, wherein $h_1$ is the depth of the channel of the feed section at the hind end thereof, $h_2$ is the depth of the channel of the melting section at the forward end thereof and D is the outer diameter of the screw.

The metering section separated from the melting section by the decompression section has a channel of a little longer depth than that of conventional one. The decompression section provided between the both melting and metering section force the melted resin fed from the melting section to flow slower with a lower pressure. That is, the average velocity and the pressure of the melted resin flow are forced to decrease with the result that the melted resin is forced to be mixed. In this connection, if the resin fed to the decompression section contains unmelted material, the unmelted material will be completely melted there in the mixing process and, thus, introduction of such non-melted material into the metering section is prevented. Additionally, the mixing action in the decompression section renders the temperature of the melted material uniform and reduces pressure variation, so that the extrusion rate becomes uniform.

It should be noted that the cross sectional area of the channel in the decompression section is very important in the design of the present invention. If this cross sectional area were to be excessively large, an excessively decompressed state would be created, with the result that the sam type of variation of the extrusion rate (or surging) as with some kind of the vent type extruder will occur. The pressure in the decompression section, is equal to a substantial extrusion pressure in the melting section. In this connection, it has been experimentally confirmed that, in the extruder according to the present invention, when the above pressure in the decompression section is lower than the head pressure (i.e., the extrusion pressure in the metering section), plasticated resin can be extruded at a higher extrusion rate than that of the conventional one-stage screw extruder.

The screw of the present invention is so designed that enough heat energy to melt the solid materials of resin is allowed to be generated by viscous dissipation due to the revolution of the screw and unnecessary viscous dissipation after melting is retarded as much as possible. Assuming that heat energy due to viscous dissipation is represented by Q and shear rate is represented by $\gamma$, $Q \propto \gamma^2$ and $\gamma \propto DN/h$, where D is outer diameter of the screw, N is number of revolutions of the screw and $h$ is the depth of the screw channel. In a case where the solid resin is melted and extruded with the screw turning a high rate of speed, the necessary heat energy due to viscous dissipation for melting the resin can be ensured even by using a screw where the channel depth $h_2$ is decreased and the length of the melting section is shortened to the extent corresponding to the decreased channel depth. In this case, the space between the internal surface of the barrel or cylinder and the bottom surface of the channel is accordingly shortened with the result that the thickness of the resin passing through the space is reduced. This enhances the efficiency of the heat-transfer to the resin and, thus, promotes melting of the resin.

If the compression ratio $\epsilon$ of the melting section is set to a value more than the usual compression ratio (which value depends on the kinds of resin), the profile of the pressure elevation in the melting section becomes steep and, thus, the heat generated due to the viscous dissipation becomes more. Additionally, this compensates for the reduction of back pressure which would occur if the compression section is shortened. Therefore, in this case, bubbles in the melted resin can be prevented from moving toward the head of the extruder.

Figure 1B:
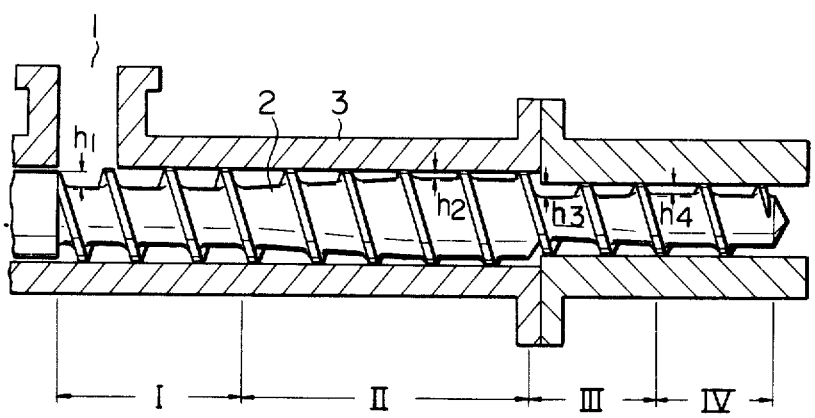

Referring to FIGS. 1A and 1B, each extruder of the present invention comprises a barrel or cylinder 3 with a hopper 1 and a two-stage screw 2 with a channel mounted in the barrel for rotation. The screw 2 has a feed section I, a melting section II, a decompression section III and a metering section IV in a sequence. The feed section I has a channel with a constant depth $h_1$. The melting section II, which is subsequent to the feed section, has a channel portion the depth of which gradually decreases along the forward direction to a value of $h_2$. The decompression section III, which is subsequent to the melting section, has a channel portion the depth of which increases to a value of $h_3$ and gradually decreases to a value of $h_4$. The metering section IV, which is subsequent to the decompression section, has a channel portion with a constant depth $h_4$.

The extruder shown in FIG. 1A has a barrel with a constant inner diameter and a screw with a constant outer diameter. The extruder shown in FIG. 1B has a screw with an outer diameter which is a constant value over the feed and melting sections and a smaller constant value over the decompression and metering sections and a barrel with the inner diameter corresponding to the outer diameter of the screw.

The channel depth $h_2$ of the melting section II is determined so that the compression ratio of the melting section II to the feed section I is the predetermined value of $\epsilon$. $\epsilon$ is expressed by $(h_1(D-h_1)/h_2(D-h_2))$, where D is the constant outer diameter of the screw over the feed and melting sections.

Solid resin material is introduced into the feed section I from the hopper 1 by revolution of the screw 2 at an introducing pressure of $P_1$. The solid resin fed from the feed section I to the melting section II is compressed and forced to rotate in the section space defined by the internal surface of the barrel 3 and the screw channel and, thus, is melted by heat generated due to the viscous dissipation. The melted resin is subjected to a first metering in this melting section and is extruded forwardly to the decompression section III. The resin thus introduced into the decompression section III contains unmelted resin and proceeds forwardly in an unstable state. In this case, if a screw having a constant flight lead is adopted, the flow rate and pressure of the resin are reduced. If such reduction is excessively great, the pressure variation which stems from the feed section and the melting section subsequent thereto is not allowed to be absorbed in the decompression section. This leads to the occurrance of pressure variation at the output opening of the extruder or at the head of the extruder and, thus, to difficulty in extruding the plasticated resin at a constant extrusion rate. It has been experimentally confirmed that such disadvantageous phenomenon can be prevented by selecting the optimal value of a ratio, which is a ratio of a cross sectional area $S_3$ of the channel at the place where the melted resin is introduced from the melting section to a cross sectional area $S_2$ of the channel at the place where the melted resin leaves the melting section. That is, it has been confirmed that, when $\epsilon > S_3/S_2 > 0.5\ \epsilon$, the above-mentioned disadvantageous phenomenon can be prevented.

Figure 2:
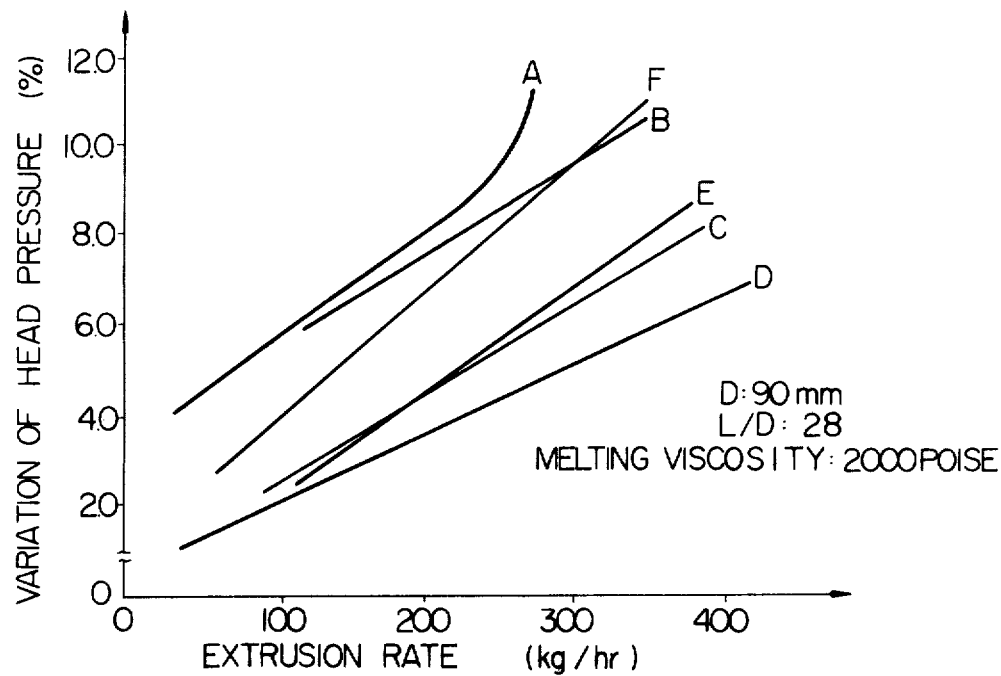
FIGS. 2 through 4 are graphs, each showing extrusion rates with respect to various head pressures, at several ratios of $S_3/S_2$, in an extruder having a screw of a constant outer diameter using a resin material of a specific melting viscosity.
Figure 3:
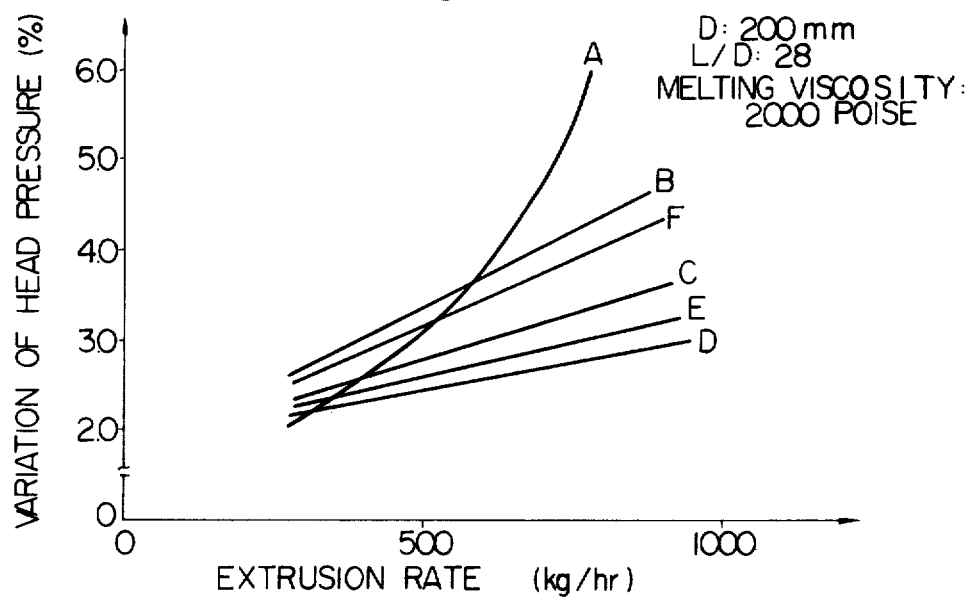
Figure 4:
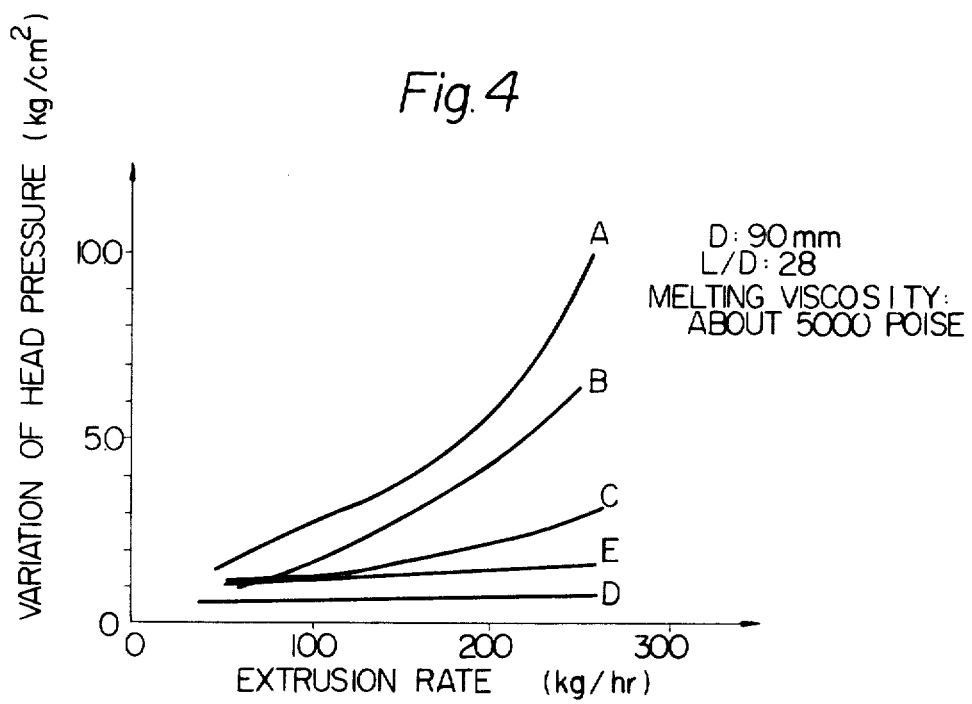

FIGS. 2, 3 and 4 show the phenomenons mentioned above. FIGS. 2 and 4 relate to an extruder having a screw with an outer diameter of 90mm, while, FIG. 3 relates to an extruder having a screw with outer diameter of 200mm. In the extruder according to FIGS. 2 and 3, resin having a melting viscosity of about 2000 poise is applied, while in the extruder according to FIG. 4 resin having melting viscosity of about 5000 poise is applied. Since a resin having relatively low melting viscosity (about 2000 poise) is applied in an extruder, the head pressure variation in FIGS. 2 and 3 is conventionally expressed by percentage (%). And since a resin having a relatively high melting viscosity (about 5000 poise) is applied, the head pressure variation in FIG. 4 is conventionally expressed in units of kg/cm².

Referring to FIGS. 2 through 4:

A is a profile of head pressure variation to extrusion rate with regard to a representative example of the conventional one-stage screw;

B is a corresponding profile with regard to the two-stage screw under the conditions that $S_3/S_2 = 1.1\ \epsilon$ and $h_4/h_2 = 1.25$;

C is a corresponding profile with regard to the two-stage screw under the conditions that $S_3/S_2 = 0.95\ \epsilon$ and $h_4/h_2 = 1.25$;

D is a corresponding profile with regard to the two-stage screw under the conditions that $S_3/S_2 = 0.8\ \epsilon$ and $h_4/h_2 = 1.25$;

E is a corresponding profile with regard to the two-stage screw under the conditions that $S_3/S_2 = 0.6\ \epsilon$ and $h_4/h_2 = 1.25$; and; $3/h_2$ F is a corresponding profile with regard to the two-stage screw under the conditions that $S_3/S_2 = 0.45\ \epsilon$ and $h_4/h_2 = 1.25$.

All of the above two-stage screws are of the configuration shown in FIG. 1A and their ratio of L/D is 28. As is apparent from these figures, there is a tendency in each of A thru F for the head pressure variation to increase. In the case of the conventional one-stage screw A, the degree of this tendency is maximum and the practically allowable upper limit of the extrusion rate is at a relatively low level of the extrusion rate. In the case of the two-stage screws of B through F, it can be seen from the figures that there is a tendency that when the ratio $S_3/S_2$ decreases to some level, the head pressure variation to the extrusion rate decreases and when the ratio $S_3/S_2$ decreases below said level, the head pressure variation to the extrusion rate increases, in turn. This means that there exists a minimum value of the head pressure variation to the extrusion rate.

Generally, in the case of the conventional one-stage screw extruder, when the extrusion rate increases, the head pressure variation elevates steeply. Contrary to this, in the case of the two-stage screw extruder of the present invention, the head pressure variation increases approximately linearly, according to the increase of the extrusion rate.

A practical extrusion rate of the conventional one-stage screw extruder is 150 kg/hr and the corresponding head pressure variation is about 7% with respect to a screw having an outer diameter of 90mm as depicted in FIG. 2. However, it is required that the head pressure variation be 4% at the highest, if a thin film of an uniform thickness or a thin filament of an uniform diameter is to be extruded.

According to the two-stage screw extruder of the present invention, as shown in FIG. 2, the head pressure variation of 4% is attained at an extrusion rate of 200 kg/hr over the value of 150 kg/hr. If the head pressure variation is allowed to increased up to 7%, which is the same as that of the above-mentioned one-stage screw extruder, the extrusion rate of the two-stage screw extruder can be elevated to a level of about 400 kg/hr.

Referring to the examples of the extruders having an outer diameter of 200mm shown in FIG. 3, a similar tendency to the above is presented. Even in the case of the examples shown in FIG. 4, in which the same screws as those of FIG. 2 are used but resins having a viscosity different from those of FIG. 2 are applied, a similar tendency is presented.

Therefore, the two-stage screw extruder of the invention operates with a head pressure variation of less than 4%, while the extrusion rate is maintained at the practical level of the conventional one-stage screw extruder, under the condition that $\epsilon > S_3/S_2 > 0.5\ \epsilon$. This is true, irrespective of the outer diameter of the screw, as far as a resin having a melting viscosity ranging from about 2000 to about 5000 poise is applied. However, when a temperature variation of the extrudate and/or the head pressure variation is permitted to occur to a small extent, the above-mentioned relationship can also be effectively applied to a resin having a melting viscosity ranging from about 1,000 to about 10,000 poise.

In another aspect, the screw of the present invention has a decompression section between a melting section and a metering section so that the pressure distribution profile along the forward direction is ensured to be higher than the atmospheric pressure and has an inflection point. The resin material containing melted and unmelted resin, which is conveyed by the rotating screw, proceeds forwardly over the melting section through the channel of the screw in such manner that the unmelted resin leads the melted resin. That is, in the channel of the melting section the unmelted resin is positioned at the high pressure side, while the melted resin is positioned at the low pressure side. When the resin in the above manner is introduced into the decompression section, the melted resin has a tendency to pass the unmelted resin and to flow first into the decompression section, since the present distribution profile along the forward direction has the inflection point at the boundary between the melting and decompression sections and the pressure changes from high to low over the boundary. This effects floating of the unmelted resin on the melted resin, just after the resin is introduced into the decompression section. Further, the resin, while being introduced into the decompression section, has a tendency to flow at an instantly increased velocity with the result that said introduced resin creeps into the leading resin. This creates a complicated flow pattern and thus effects a mixing action to which the resin is subjected. The above-mentioned floating effect and mixing effect causes a good mixing of the melted resin with the unmelted resin together with a good contact of the resin with the wall of the channel and the inter surface of the barrel which supplies external heat energy to the resin. Consequently, a good heat-transfer to the unmelted resin from the barrel is effected to promote melting of the unmelted resin.

If the channel depth $h_3$ of the decompression section is excessively decreased, the inflection point of the pressure distribution profile would be lost and if it is excessively increased, the decompression action would become excessively great. It has been experimentally confirmed that in both such cases, favourable effect as mentioned before cannot be attained. It has been confirmed that a desired condition for the effect is a ratio of the cross sectional area $S_3$ of the decompression section at the channel depth $h_3$ to that $S_2$ of the melting section at the channel depth $h_2$, i.e. $S_3/S_2$, of around the value 0.8 $\epsilon$.

As shown in FIG. 1A or FIG. 1B, the decompression section has a channel portion where the channel depth decreases from $h_3$ to $h_4$. Accordingly the melted resin is compressed with a gradually increased pressure along forward direction from $P_3$ to $P_4$ while proceeding forwardly up to the input end of the metering section by rotation of the screw. That is, the melted resin is recompressed from the decompressed state to the head pressure, when it reaches the metering section. Since the melted resin introduced into the metering section does not contain unmelted resin, it is not necessary to supply heat energy for melting the resin any longer. That is, only compensation for the heat lost from the melted resin due to radiation therefrom is required to maintain the melted state. Maintaining the pressure $P_4$ at a level a little over the atmospheric pressure improves the metering function of the screw and, thus, effects a very stable extrusion.

Figure 5:
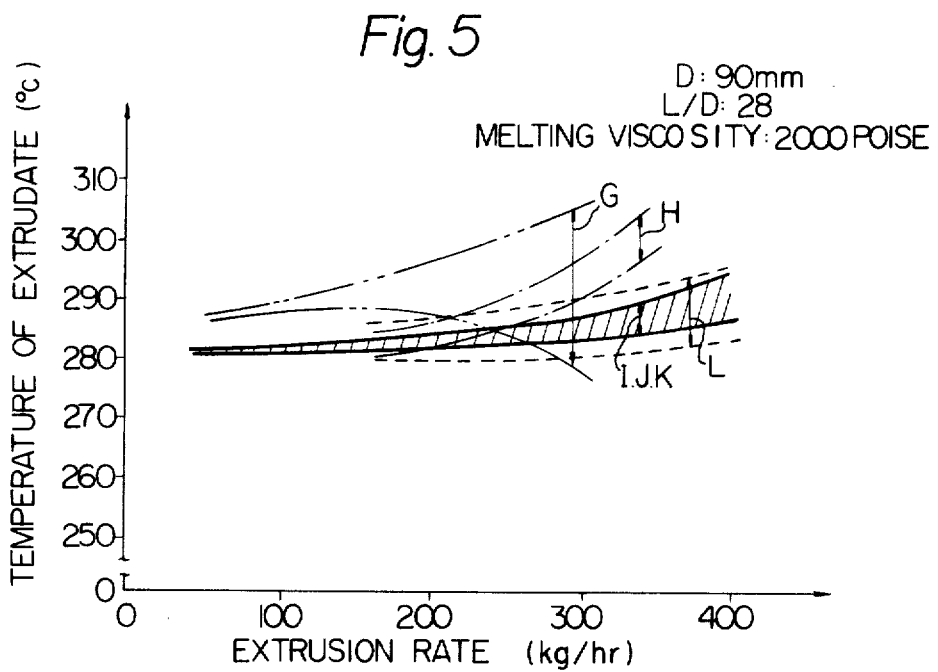
FIGS. 5 through 7 are graphs, each showing temperatures of the extrudates with respect to the extrusion rate in the above-mentioned extruder and correspond to FIGS. 2 through 4 respectively.
Figure 6:
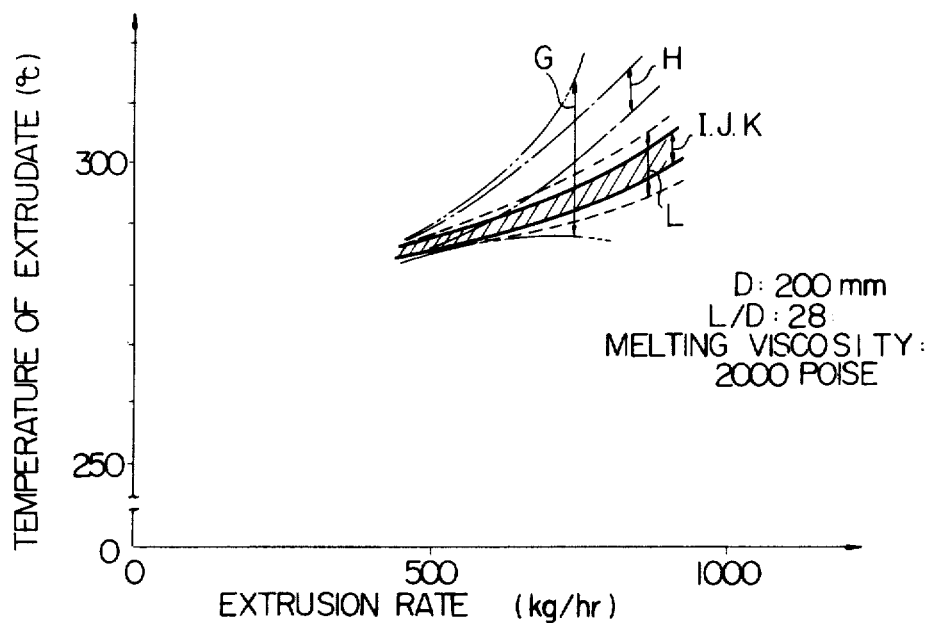
Figure 7:
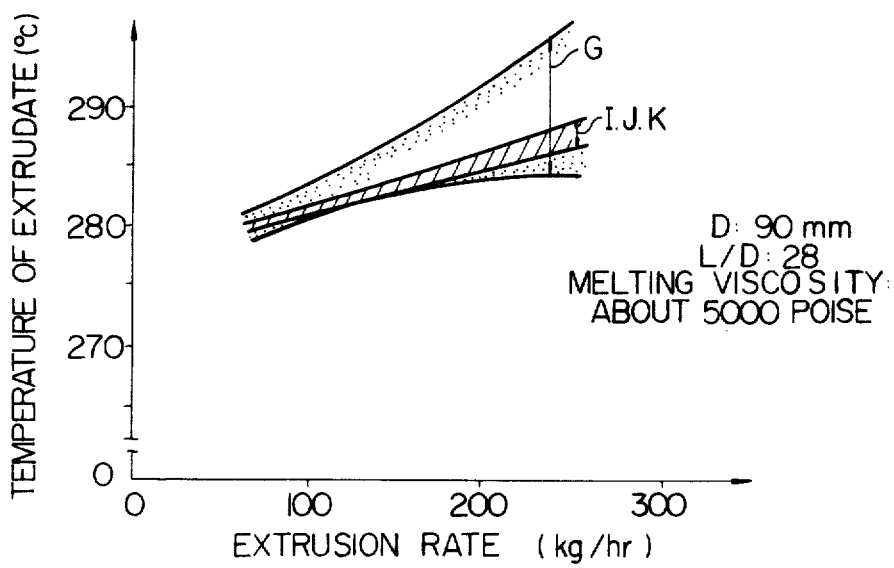

However, it is not desirable for the temperature of extrudate from the metering section to vary along with the variation of the extruder rate. For this reason, research has been conducted with regard to the relation of the extrudate temperature and the extrusion rate under various ratios of $h_4/h_2$. The results of this research are shown in FIGS. 5 through 7. In these figures, the variations of the extrudate temperatures are shown by the distance between each pair of upper and lower lines. FIGS. 5 and 7 show the temperature variations with respect to screws with a constant outer diameter of 90mm, while FIG. 6 shows the same screws with a constant outer diameter of 200mm.

Referring to FIGS. 5 through 7:

G is a profile of the temperature variation to extrusion rate regarding a representative example of the conventional one-stage screw;

H is the corresponding profile regarding a two-stage screw under the conditions that $S_3/S_2=0.8$ $\epsilon$ and $h_4/h_2=1.10$;

I is the corresponding profile regarding a two-stage screw under the conditions that $S_3/S_2=0.8$ $\epsilon$ and $h_4/h_2=1.17$;

J is the corresponding profile regarding a two-stage screw under the conditions that $S_3/S_2=0.8$ $\epsilon$ and $h_4/h_2=1.35$;

K is the corresponding profile regarding a two-stage screw under the conditions that $S_3/S_2=0.8$ $\epsilon$ and $h_4/h_2=1.45$, and;

L is the corresponding profile regarding a two-stage screw under the conditions that $S_3/S_2=0.8$ $\epsilon$ and $h_4/h_2=1.50$.

All of the above two-stage screws are of the configuration shown in FIG. 1A and their ratio of L/D is 28.

As is apparent from the figures, profiles G through L have a tendency that the extrudate temperature and the variation thereof at the extruder head increase according to an increase in the extrusion rate. However it should be noted that, in the case of the conventional one-stage screw G, the temperature variation considerably increases according to increase of the extrusion rate and, thus, reaches the practically allowed upper limit at a relatively low level of the extrusion rate.

It has been found that there exists an optimum range as to the ratio of $h_4/h_2$ as well as the ratio of $S_3/S_2$. That is, as is apparent from FIGS. 5 through 7, $1.5 > h_4/h_2 > 1.15$ is the practical optimum range of $h_4/h_2$.

When a two-stage screw of the present invention is designed, the value of $h_4/h_2$ can be determined together with the dimensions of the feed, melting, decompression and metering section, taking the actual results of the conventional one-stage screw into consideration. However, in order to exhibit a high performance, it is preferable to set the ratio of L/D to not less than 24, the length of the feed section to not less than 6D and the length of the forward portion of melting section, where the channel depth is a value $h_3$, to 4D. This is in a case where a resin of polyolefine or the like is extruded.

In the case of polyester resin, it is preferable to set the length of the feed section, corresponding to the above, to not less than 8 to 9D and the length of the forward portion of the melting section, corresponding to the above, to not less than 4 to 5D.

Figure 8:
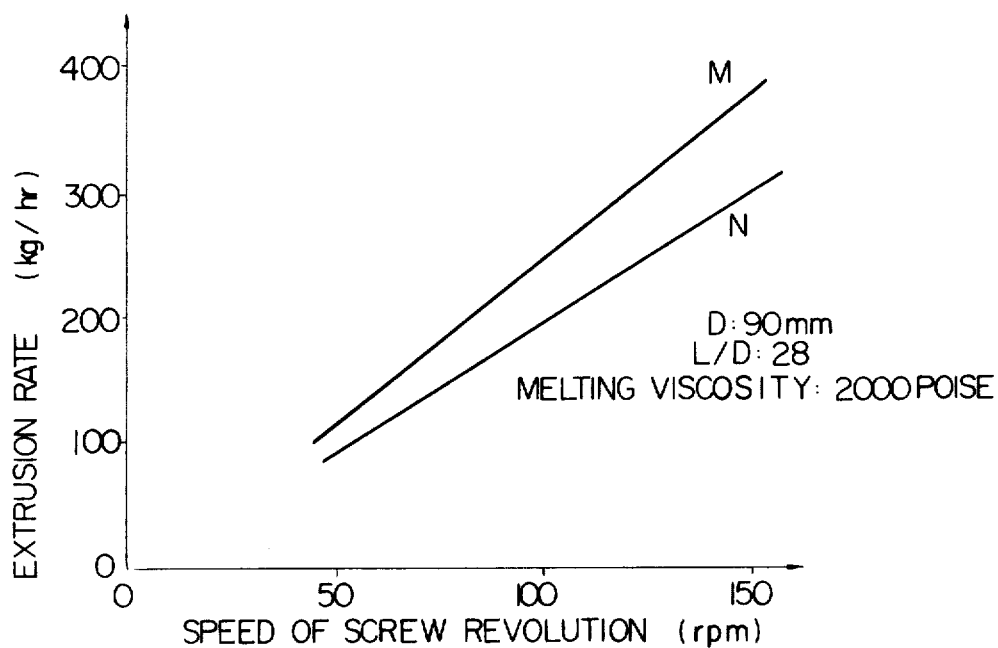
FIG. 8 is a graph showing extrusion rates with respect to speeds of revolution of the screws in an extruder according to the present invention and a conventional extruder provided with a screw having a specially designed mixing means at the middle section thereof in order to compare the extrusion performances between the both extruders.

Compared with the specially designed conventional screw of one-stage type which has a complicated additional means for mixing the resin so as to improve the mixing effect with the result that the extrusion performance is slightly increased, the screw of two-stage type according to the present invention attains a desirable mixing effect without provision of any such additional means and exhibits excellent features regarding extrusion performance, extrudate temperature and consumed power. FIG. 8 is provided for comparison of the extrusion performance between the screw of the present invention and the above-mentioned one-stage screw which has the additional means for mixing. The mixing means consists of first grooves for introducing resin therethrough and second grooves for discharging the resin therethrough. Said first and second grooves are arranged alternately on the screw thread, in the middle section of the one-stage screw, in such a manner that the neighbouring first and second grooves are separated by a bank. Referring to FIG. 8. M indicates the extruder having a screw of the present invention, while N indicates the conventional extruder having a screw provided with the additional mixing means. Each extruder has a ratio L/D of 28. The resin used has a melting viscosity of 2000 poise.

According to the present invention, not only a screw having a constant outer diameter and a constant channel flight lead but also a screw such as one consisting of portions with different outer diameters with a constant channel flight lead or with different channel flight leads has substantially the same effects as mentioned above. The former type of screw is, for example, shown in FIG. 1A, while the latter type of screw is, for example, shown in FIG. 1B. Further, according to the present invention, a screw may be designed so that a feed section has a channel depth which gradually decreases from the value of $h_1$ in the forward direction. Such a feed section as the above effects gradual compression of the feed resin with the result that bubbles or air, which often are present in the feed resin of the conventional feed section having a constant channel depth are eliminated to a great extent, by forcing said bubbles or air to travel in the reverse direction of the flow of the said feed resin.

Figure 9:
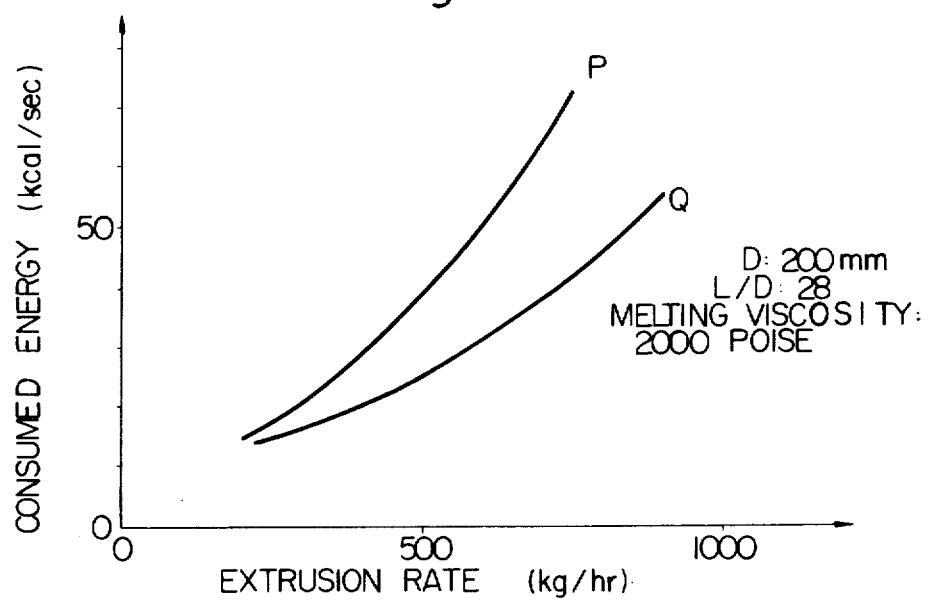
FIG. 9 is a graph showing, in comparison, the consumed energies in the two-stage screw extruder of the present invention and the conventional one-stage screw extruder.

An extruder having a two-stage screw of the present invention has the advantage that the consumed power is considerably less than that of the conventional extruder. FIG. 9 is provided for comparison of the consumed energy or power with respect to the extrusion rate between the two-stage screw extruder of the present invention and the conventional one-stage screw extruder, both of which have a screw of a constant outer diameter of 200mm and a L/D ratio of 28. In each case, a resin of a metering viscosity of 5000 poise is applied. Referring to FIG. 9, P is a consumed energy profile of the conventional screw and Q is the corresponding profile of the screw according to the present invention, under the conditions that $S_3/S_2=0.8$ and $h_4/h_2=1.35$.

The cosumed energy contains power for driving the screw, electric energy for a barrel heater and power for a cooling system. As is apparent from FIG. 9, the difference in comsumed energies between the extruder of the present invention and the conventional extruder increases according to the increase of the extrusion rate, and the consumed energy of the extruder according to the present invention is considerably less than that of the conventional extruder. Further, as is apparent from FIGS. 2 through 7, the extruder having a screw of the present invention ensures a high extrusion stability regardless of variation of the extrusion rate and, particularly, it should be noted that a high extrusion stability is attained even at a high level of extrusion rate compared to the conventional extruder.

What we claim is:

1. A screw for use in a non-vent type extruder and having a diameter D, comprising: a feed section having a channel depth $h_1$ at a rear end thereof; a melting section subsequent to said feed section, having a channel depth gradually decreasing along a forward direction from said value $h_1$ to a value $h_1$; a decompression section subsequent to said melting section, having a channel depth increasing from said value $h_2$ to a value $h_3$ and gradually decreasing to a value $h_4$; and a metering section subsequent to said decompression section, where the channel depth has a constant value of $h_4$; where $h_1 > h_3 > h_4 > h_2$;

$$\frac{h_3}{h_2} \frac{(D - h_3)}{(D - h_2)} > 0.5 \frac{h_1}{h_2} \frac{(D - h_1)}{(D - h_2)}:$$

and where $1.5 > (h_4/h_2) > 1.15$.

* * * * *